INVENTOR
ROGER H. FOURNIER
BY
Harold W. Eaton
ATTORNEY

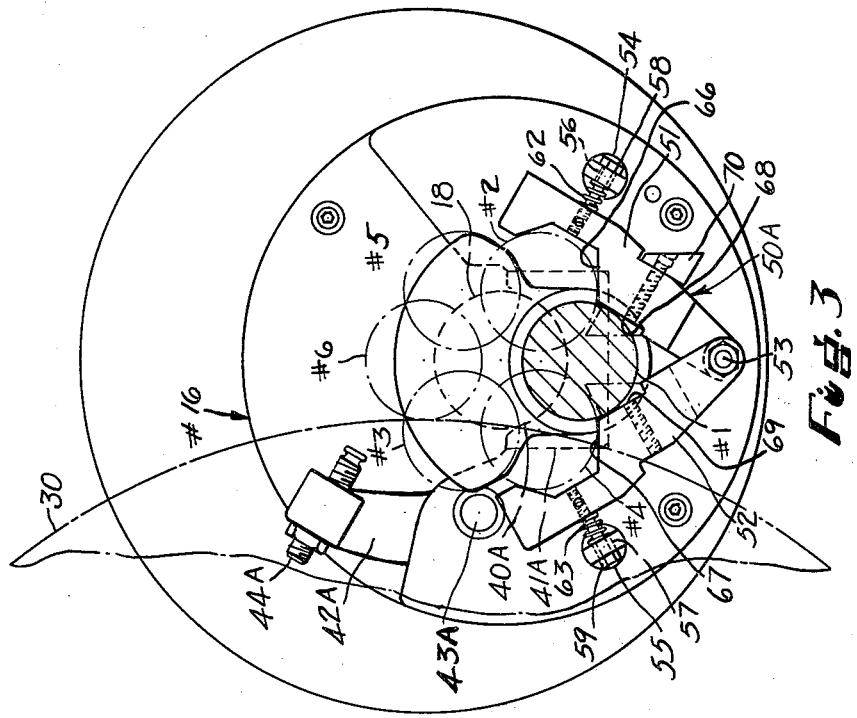
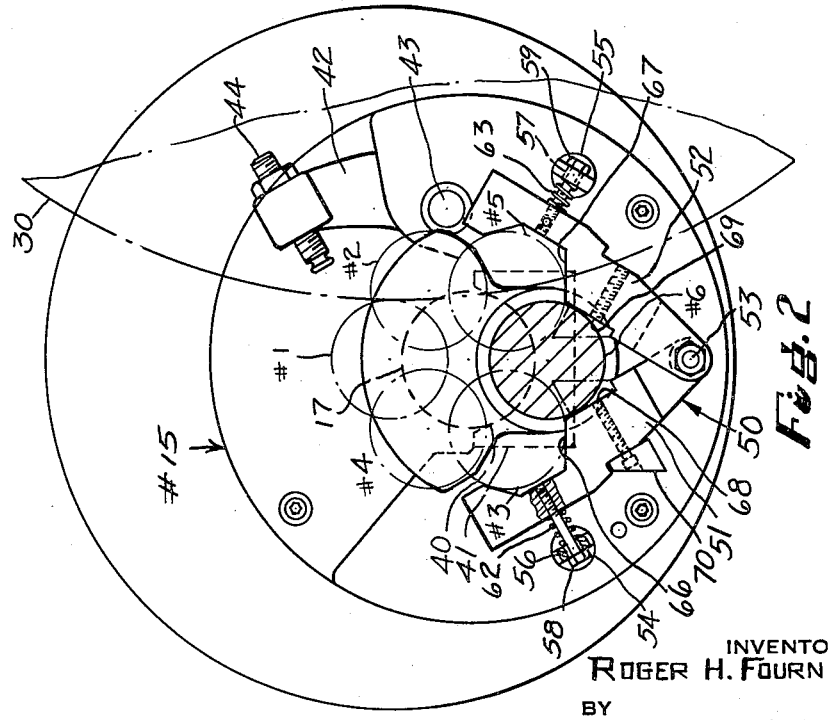

United States Patent Office 3,006,118
Patented Oct. 31, 1961

3,006,118
WORK POSITIONING DEVICE
Roger H. Fournier, Worcester, Mass., assignor to Norton Company, Worcester, Mass., a corporation of Massachusetts
Filed Mar. 13, 1959, Ser. No. 799,243
6 Claims. (Cl. 51—237)

The invention relates to grinding machines and more particularly to a work positioning mechanism therefor.

One object of the invention is to provide a simple and thoroughly practical work positioning mechanism for precisely positioning offset portions of a work piece, such as crankpins of a crankshaft for a grinding operation. Another object is to provide a work positioning mechanism which utilizes an unground offset portion successively to position a limited number at other portions of the work piece to be ground, and utilizes one of the limited number of offset portions finished thus to position the remaining portions to be ground which include said unground offset portion thereby to precisely maintain the desired relationship between all of the respective offset portions and the axis of the work piece.

Another object is to provide a work positioner which is versatile and can be utilized to grind one offset portion or crankpin at a time such as is done in an automated multiple machine arrangement, or it can be utilized on a single machine set-up to grind all offset portions thereof. Other objects will be in part obvious or in part pointed out hereinafter.

One embodiment of the invention has been illustrated in the drawings in which:

FIG. 2 is a cross sectional view, on an enlarged scale, of the work positioner mounted on left hand rotatable work support, taken approximately on the line 2—2 of FIG. 1;

FIG. 3 is a cross sectional view, on an enlarged scale, of the work positioner on the right hand rotatable work support, taken approximately on the line 3—3 of FIG. 1.

Figure 1:
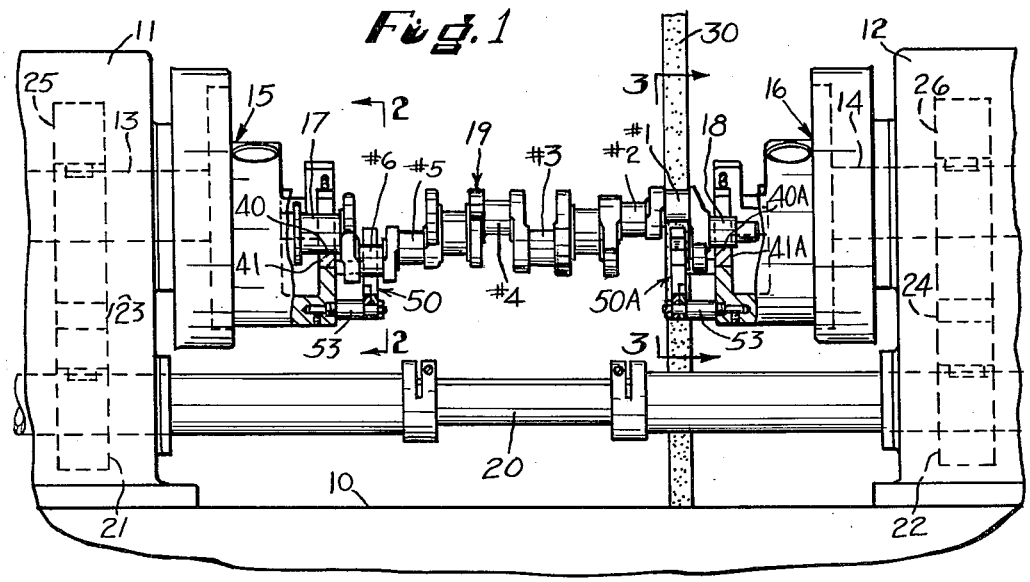
FIG. 1 is a partial front elevation of a grinding machine equipped with the work positioning mechanism, showing the work positioner in section mounted on the left and also, for illustrative purposes only, mounted on the right hand work support thereof.

This invention is particularly applicable to a crankpin grinding machine such as that shown in the prior U.S. patent to Stewart S. Mader, No. 2,723,503 dated November 15, 1955, to which reference may be had for details of disclosure not contained herein.

The crankpin grinding machine, as shown in the drawings, is provided with a transversely movable rotatable grinding wheel 30 and a table 10 which is provided with a pair of spaced axially aligned work heads 11 and 12. The work heads 11 and 12 are provided with axially aligned rotatable flanged spindles 13 and 14 respectively. A pair of work supporting pot chucks 15 and 16 are fixedly mounted on the adjacent end of the spindles 13 and 14 respectively. The pot chucks 15 and 16 are arranged to support the end main bearings 17 and 18, respectively, of a crankshaft 19.

A rotatable drive shaft 20 is provided for synchronously rotating the work supporting pot chucks 15 and 16. A pair of spaced sprockets 21 and 22 mounted on the shaft 20 are connected by a pair of link chains 23 and 24 respectively with a pair of sprockets 25 and 26 respectively which are fixedly mounted on the shafts 13 and 14.

The pot chucks 15 and 16 are preferably the old and well known chucks, such as, are used in the conventional crankpin grinding machine. These chucks are provided with half bearings 40 and 40A in bearing blocks 41 and 41A for receiving the main bearings 17 and 18 of the crankshaft 19 to axially position the crankshaft 19. A pair of pivotally mounted clamping jaws 42 and 42A supported by a pair of pivot studs 43 and 43A, respectively, are provided on the pot chucks 15 and 16, respectively. The clamping jaws are each provided with a clamping screw 44 and 44A which are arranged to clamp the main bearings 17 and 18 of the crankshaft 19 on the half bearings 40 and 40A when the clamping jaws 42 and 42A are swung about their pivot studs 43 and 43A to hold the crankshaft 19 in a given indexed position during a grinding operation.

A pair of work positioners 50 and 50A are provided for precisely positioning the crankpins to be ground in axial alignment with the axis of the work spindles 13 and 14 respectively. The work positioners 50 and 50A are identical in construction except that one is arranged for mounting on the left hand work head 15 and the other upon the right hand work head 16. The positioner 50 utilizes the crankpin #6 of the crankshaft 19 successively to angularly position crankpins #1, #2, and #4 which are above the center plane of the crankshaft 19 as shown in FIG. 2. The positioner 50A utilizes the crankpin #1 of the crankshaft 19 to angularly locate the crankpins #3, #5, and #6 which are all in a position above the center pane of the crankshaft 19, as shown in FIG. 3 with the crankshaft inverted as compared to the showing in FIG. 2.

While FIG. 1 illustrates both work positioners 50 and 50A in operative relation to the respective pot chucks 15 and 16, it is, of course, clearly evident that they are not both installed and used at the same time since each is effective by itself in the manner described below to position the crankshaft 19 for grinding three of the six crankpins thereon.

The two work positioners 50 and 50A, as above described, are intended for use when a single machine is required to grind all or any of the crankpins of a crankshaft 19.

In an automated set-up where a plurality of spaced grinding machines are utilized, in which each individual machine grinds a different crankpin, one work positioner 50 is mounted on each of either the left or right hand work heads on several of the grinding machines, and the work positioners are mounted on each of the opposite work heads of the remaining machines, in order to successively grind all of the six crankpins on the crankshaft 19.

The work positioners 50 and 50A are identical in construction and each consists of a pair of pivotally mounted members 51 and 52 which pivot about a common pivot stud 53 at their lower ends. The pivot studs 53 are fixedly mounted on the adjacent faces of the pot chucks 15 and 16. The upper ends of the members 51 and 52 are guided and supported by a pair of studs 54 and 55 which are also fixedly mounted on the pot chucks 15 and 16. The respective studs 54 and 55 have flat end portions provided with clearance holes 56 and 57 through which pass bolts 58 and 59 which are screw threaded into the members 51 and 52. A pair of compression springs 62 and 63 surround the bolts 58 and 59 respectively, and are interposed between the flat surfaces of the end portions of studs 54 and 55 and the face of the pivotally mounted members 51 and 52 respectively. The compression springs serve normally to yieldably maintain the members 51 and 52 in predetermined adjusted positions. The members 51 and 52 are provided with V-shaped notches 66 and 67 and a pair of surfaces 68 and 69 which form a V-shaped notch between the members 51 and 52 respectively.

In order to facilitate positioning crankshafts, a detachable guide block 70 is provided which may be attached to either of the members 51 or 52. When not in use the guide block 70 may be positioned as illustrated in full lines in FIG. 2. The guide block 70 may be attached to the inner faces 68 or 69 of the members 51 or 52, as shown in broken lines in FIG. 2. In this position, the guide block will serve to guide the locating crankpin #6 and/or #1 into the V-notches 67 or 66 precisely to position the crankpin to be ground. The guide block 70 is particularly useful when a crankshaft 19 to be ground is loaded by an automatic loading mechanism, such as, that shown and described in the U.S. patent to J. W. Narel, No. 2,813,381 dated November 19, 1957.

When a crankshaft 19 is lowered into the pot chucks 15 and 16 and the crankpin #6 nearest the pot chuck 15 is utilized for location, the crankpin #6 may be positioned in the vertical plane through main bearings 17 and 18 so that it moves into engagement with the V-notch formed between members 51 and 52, or it may be positioned to one side or the other of this vertical plane so that it moves into engagement with either the notch 66 or the notch 67 in either the surface 68 or the surface 69 of the arms 15 or 25, respectively. When the crankpin #6 is lowered into engagement with the V-notch formed between the members 51 and 52, the main bearings 17 and 18 of the crankshaft 19 move in supporting engagement with the half bearings 40 and 40A so as to precisely position the #1 crankpin in axial alignment with the spindles 13 and 14 respectively. The crankpin #1 to be ground is located in the desired and predetermined relationship with the crankpin #6 and the axis of rotation of the spindles 13 and 14.

When the crankpin #6 is lowered so that it engages the V-notch 67, the crankpin #2 is precisely positioned into axial alignment with the spindles 13 and 14. Similarly when the crankpin #6 is lowered so that it engages the V-shaped notch 66, the crankpin #4 is precisely positioned for a grinding operation. It will be readily apparent from the foregoing disclosure that crankpins #1, #2, and #4 are all positioned for grinding by utilizing crankpin #6 for location. However, since all of the crankpins cannot be located from the same crank pin #6, the finish ground crankpin #1 which is on the opposite end of the crankshaft 19 from crankpin #6 and nearest to the pot chuck 16 is utilized to locate crankpins #3, #5, and #6 for a grinding operation in the same manner as described above. In the latter case the work locator arms 51 and 52 are located on the right hand work head 16, as shown in FIG. 3.

Figure 4:
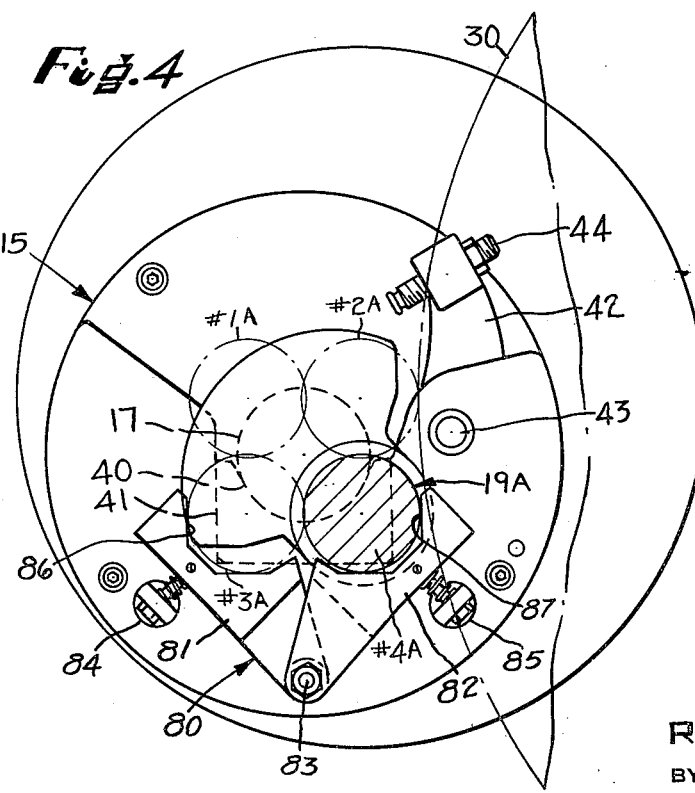
FIG. 4 is a modification of the work positioner.

A modification of the positioning mechanism 80 is shown in FIG. 4 which is particularly useful for grinding crankpins of a crankshaft 19A having only four crankpins to be ground. As shown in FIG. 4, the modified angular locator 80 consists of a pair of members 81 and 82 pivotally supported by a common pivot stud 83 which is mounted on the pot chuck 15. The upper ends of the members 81 and 82 are guided and supported by a pair of studs 84 and 85 in a similar manner to that above described for the members 51 and 52. The members 81 and 82 are provided with V-shaped notches 86 and 87 respectively which engage the crankpin #4A nearest the left hand work holder 15 when mounted thereon. When the crankpin #4A engages the V-shaped notch 87, it will precisely position the crankpin #2A for a grinding operation. Similarly when the crankpin #4A engages the V-shaped notch 86, it will precisely position the crankpin #1A for a grinding operation.

When the work positioning locator 80 is mounted on the right hand pot chuck 16, the finish ground crankpin #1A which is adjacent to the pot chuck 16 is utilized for precisely positioning the crankpins #3A and #4A for a grinding operation, in the same manner as above described.

It will thus be seen that there has been provided by this invention, apparatus in which the various objects hereinbefore set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawings is to be interpreted as illustrative and not in a limiting sense.

I claim:

1. A crankpin positioning mechanism for a crankpin grinding machine having a pair of axially aligned rotatable work supports to support the opposite ends of a crankshaft comprising a pair of elongate pivotally mounted shaped members, a pivot stud on one of said supports to support one end of each of said shaped members each having crankpin engaging surfaces disposed at an angle to each other for sequentially engaging a given crankpin to position other crankpins successively for grinding, a pair of guide studs on the same one of said supports for supporting the other ends of said shaped members, attached to said rotatable work supports, adjusting means between the pair of guide studs and the shaped members to facilitate adjusting the position of said members, and yieldable means between the pair of guide studs and the shaped members yieldably to maintain the shaped members in predetermined positions.

2. A crankpin positioning mechanism for a crankpin grinding machine comprising a pair of rotatable work supporting pot chucks for supporting opposite ends of a crankshaft to be ground, a supporting stud mounted on one of said rotatable pot chucks, a pair of members each supported by said stud having V-shaped locating surfaces for successively engaging a crankpin adjacent to one of said rotatable work supporting pot chucks precisely to position a crankpin to be ground, said members having locating surfaces disposed at an angle to each other for engaging said crankpin to position another crankpin to be ground, a pair of guide studs for supporting and guiding the upper ends of said members, and yieldable means between the pair of said guide studs and said members for maintaining said members in operative engagement with said crankpin.

3. A crankpin positioning mechanism for a crankshaft grinding machine comprising a pair of rotatable work supporting pot chucks, a pivot stud mounted on each of said chucks, a pair of members pivotally supported on each of said studs, a V-shaped work locating surface on each of said members for engaging a different crankpin, said members having locating surfaces which are disposed at an angle to each other to form another V-shaped locating surface, adjustable means engaging a pair of supporting studs on each of said rotatable work supporting pot chucks to guide and support the upper ends of said members, and yieldable means interposed between each of said supporting studs and said members.

4. A method of positioning crankshafts to be ground in a crankpin grinding machine comprising mounting a crankshaft for grinding with its longitudinal axis spaced from and parallel to an axis of rotation, successively placing a given crankpin in engagement with different portions of a given crankshaft positioning means in predetermined different positions spaced angularly about the axis of a crankshaft, and angularly constraining a given crankpin precisely in each of such spaced positions to sequentially position a plurality of other crankpins coincident with the axis of rotation for grinding said other crankpins.

5. A crankpin positioning mechanism for a crankpin grinding machine comprising a pair of rotatable work supporting pot chucks for supporting opposite ends of a crankshaft to be ground, a supporting stud mounted on one of said rotatable pot chucks, a pair of elongated members each supported adjacent one end thereof by said supporting stud and together defining a plurality of spaced pairs of V-shaped locating surfaces disposed for successively engaging a given crankpin adjacent to one of said rotatable work supporting pot chucks precisely to position each of a plurality of other crankpins to be ground, a pair of guide studs for supporting and guiding the other ends of said members, and yieldable means between the pair of said guide studs and said members for maintaining said members in operative engagement with said crankpin.

6. A crankpin positioning mechanism for a crankpin grinding machine comprising a pair of rotatable work supporting pot chucks for supporting opposite ends of a crankshaft to be ground offset from the axis of rotation of said pair of pot chucks, and crankpin positioning means mounted upon one of said pot chucks shaped to include a plurality of crankpin locating surfaces disposed in opposed V-shaped pairs symmetrical about spaced radii of a crankshaft, said opposed pairs of crankpin locating surfaces being disposed for successive engagement with a given crankpin of a crankshaft to precisely position other crankpins of a crankshaft coincident with the axis of rotation of said pot chucks for grinding, means for biasing the crankpin locating surfaces of said crankpin positioning means radially toward the axis of a crankshaft, and means for limiting the displacement of the crankpin locating surfaces of said crankpin positioning means in response to said biasing means.

References Cited in the file of this patent

UNITED STATES PATENTS

| 2,447,334 | Healy | Aug. 17, 1948 |
| 2,780,895 | Silven et al. | Feb. 12, 1957 |
| 2,950,586 | Smith | Aug. 30, 1960 |

FOREIGN PATENTS

| 338,946 | Germany | July 8, 1921 |